United States Patent
Donabedian et al.

(10) Patent No.: US 9,327,768 B2
(45) Date of Patent: May 3, 2016

(54) ROOF PANEL TO BODY SIDE TETHER

(71) Applicant: FORD GLOBAL TECHNOLOGIES, LLC, Dearborn, MI (US)

(72) Inventors: Edgar Edward Donabedian, Livonia, MI (US); Darrin Neil Wagner, Bloomfield Hills, MI (US); Mark Keller, Birmingham, MI (US); Bruno M. Barthelemy, Ann Arbor, MI (US); Ali Jammoul, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/454,029

(22) Filed: Aug. 7, 2014

(65) Prior Publication Data

US 2016/0039468 A1    Feb. 11, 2016

(51) Int. Cl.
*B62D 24/00* (2006.01)
*B62D 25/06* (2006.01)
*B62D 33/06* (2006.01)
*B62D 65/02* (2006.01)

(52) U.S. Cl.
CPC .............. *B62D 24/00* (2013.01); *B62D 25/06* (2013.01); *B62D 33/06* (2013.01); *B62D 65/02* (2013.01)

(58) Field of Classification Search
CPC ......... B62D 24/00; B62D 25/06; B62D 65/02
USPC ............. 296/210, 35.1, 190.08, 190.11, 37.6, 296/37.7
See application file for complete search history.

(56) References Cited

U.S. PATENT DOCUMENTS

| | | | |
|---|---|---|---|
| 3,695,629 A | 10/1972 | Schlanger | |
| 5,374,098 A | 12/1994 | Nelson | |
| 5,435,362 A | 7/1995 | Chiang | |
| 5,738,405 A * | 4/1998 | Richters | B60J 1/085 296/146.15 |
| 6,256,601 B1 * | 7/2001 | Wipasuramonton | G01M 17/0078 703/7 |
| 6,386,617 B1 * | 5/2002 | Kusuma | B60J 1/085 296/146.15 |
| 7,721,837 B1 * | 5/2010 | DeVeau | B62D 39/00 180/274 |
| 8,439,434 B2 * | 5/2013 | Newberg | B60J 5/103 296/218 |
| 9,033,401 B1 * | 5/2015 | Donabedian | B62D 27/026 296/187.02 |
| 2003/0218362 A1 * | 11/2003 | Lee | B60J 7/11 296/210 |
| 2005/0082880 A1 * | 4/2005 | Lee | B62D 29/043 296/210 |
| 2007/0085386 A1 * | 4/2007 | Zirbs | B62D 25/06 296/218 |

(Continued)

OTHER PUBLICATIONS

SAE, "2015 F-150: Ford drops an aluminum blockbuster", SAE, Automotive Engineering Magazine, Jan. 8, 2014.*

(Continued)

*Primary Examiner* — Pinel Romain
(74) *Attorney, Agent, or Firm* — Jason C. Rogers; Brooks Kushman P.C.

(57) ABSTRACT

A vehicle having a roof panel connectedly extending inwardly from a body structure and a tether connectedly extending between the roof panel and body structure. The vehicle may be a pickup truck having a side body structure with an aluminum alloy internal panel and roof panel connected together to make up a portion of a passenger compartment of a cab. The tether assembly may have a mounting component adhesively connected to the roof panel and a tether rope connected to the mounting component and to the internal panel. The mounting component of the tether assembly may be taped to the roof panel. The mounting component may have a heat curing adhesive. The connector of the tether assembly may be fastened to the side body structure using a threaded fastener. The heat curing adhesive may be activated with an oven to secure the mounting component to the roof panel.

20 Claims, 2 Drawing Sheets

(56) References Cited

U.S. PATENT DOCUMENTS

2007/0252414 A1* 11/2007 Bohm .................. B60R 9/04
                                                    296/210
2009/0273209 A1* 11/2009 Joab .................. B60J 1/1884
                                                    296/215

OTHER PUBLICATIONS

Aluminum roof replacement on the Mitsubishi Lancer Evolution and Outlander, I-Car Advantage Online, Mar. 31, 2010, 2 pages.* http://amickracecarrestraints.com/products.html, "Amick Race Car Restraints ARCR", pp. 1-3.
http://www.spyderlovers.com/forums/showthread.php?33684-Left-Middle-Side-Panel-Tether, "Spyderlovers", Left Middle Side Panel Tether, pp. 1-12.
http://www.thunderpress.net/parts-products/all-the-motorcycle-parts-and-accessories-you-cant-do-without-parts 0411/2011/04/20.htm., "All the motorcycle parts and accessories you can't do without—Parts 04/11", Apr. 20, 2011, pp. 1-7.

* cited by examiner

ROOF PANEL TO BODY SIDE TETHER

TECHNICAL FIELD

This disclosure relates to vehicle body structure joints, specifically to the tethering of adjacent joined body structures to each other.

BACKGROUND

Pickup trucks are motor vehicles with a front passenger area, often referred to as a cab, and an open top rear cargo area, often referred to as a box. Cabs and boxes may be separate assemblies or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

SUMMARY

One aspect of this disclosure is directed to a vehicle having a side body structure, a roof panel connectedly extending inwardly from the body structure, and a tether connectedly extending between the roof panel and body structure.

In this aspect, the tether may have a rope section having a first end and a second end. The first end of the rope section may form a loop and be secured to itself with a securing crimp piece. The second end of the rope section may be connected to a crimped washer connector. The crimped washer connector may have a securing portion crimped around the rope section and a flat washer portion extending from the securing portion defining a hole. A fastener may be disposed within the hole to connect the tether to the side body structure.

A roof panel mounting component may also be employed. The roof panel mounting component may have a substrate portion adhesively connected to the roof panel. The roof panel mounting component may also define a tether hole to receive the loop of the first end of the rope section to connect the tether to the roof panel.

In this aspect, the rope section may be a metal cable. The roof panel may be an aluminum alloy roof panel. The side body structure may be an aluminum alloy side body structure. A portion of the roof panel may be connected to a portion of the body structure with self-piercing rivets. The roof panel and side body structure may partially define a passenger compartment and the tether may be connected to the roof panel and side body structure within the passenger compartment.

Another aspect of this disclosure is directed to a pickup truck cab having a side body assembly with an aluminum alloy internal panel and an aluminum alloy roof panel connected to and extending from the side body assembly. In this aspect, a mounting component is adhesively connected to the roof panel and a tether rope is connected to the mounting component and to the internal panel.

Similar to above, the mounting component may define a tether hole and the tether rope may have a first end routed through the tether hole forming a loop such that the tether rope is attached to itself. The tether rope may have a second end connected to a connector defining a connector hole, the connector being fastened to the internal panel with a fastener secured through the connector hole.

In this aspect, the tether rope may be a metal cable. As well, in this aspect a piece of tape may be adhesively connected to the roof panel to cover a portion of the mounting component.

A further aspect of this disclosure is directed to a method of tethering a roof panel to a side body structure. This method includes taping of a mounting component of a first end of a tether assembly to a roof panel. The mounting component has a heat curing adhesive. The method also includes fastening a connector of a second end of a tether assembly to a side body structure using a threaded fastener. In addition, the method includes activating the heat curing adhesive with an oven to secure the mounting component to the roof panel. The oven used to activate the heat curing adhesive may be an oven from a paint oven process.

The method may include looping a first portion of a rope section of the tether assembly through a hole in the mounting component and securing the rope section to itself. The method may also include crimping the connector on a second portion of a rope section of the tether assembly.

The method may further include assembling a portion of the roof panel to a portion of the side body structure using self-piercing rivets. Alternatively, or in addition to, the method may include welding a portion of the roof panel to a portion of the side body structure.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
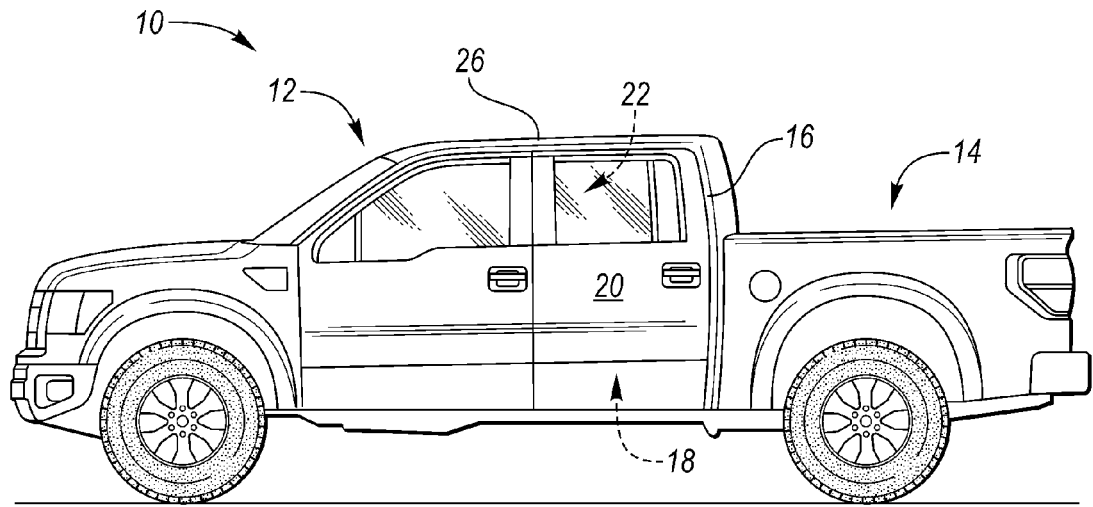
FIG. 1 is a side view of a pickup truck style vehicle.

FIG. 1 shows a vehicle 10. Vehicle 10 is a pickup truck style vehicle having a pickup truck cab 12 and a pickup truck box 14. Although a pickup truck is shown, it should be understood that the aspects in this disclosure may be applied to all vehicles and not just pickup trucks. Vehicle 10 has a side body structure 16 or side body assembly 16. The side body structure 16 may define a door opening 18 with a side door 20 hingeably attached thereto allowing access to a passenger compartment 22. The side body structure 16 may be a single stamped metal piece, or the side body structure 16 may be made up of a number of formed metal and plastic components to form an assembly. The side body structure 16 may be formed entirely from an aluminium alloy or have an aluminum alloy internal panel 24 (see FIG. 2). The aluminum alloy may be a 6xxx series aluminum alloy.

A roof panel 26 is shown connected to and extending inwardly from the body structure 16. The roof panel 26 may be a single stamped metal piece or may be made up of a number of formed metal and plastic components to form an assembly. The roof panel 26 may be formed from an aluminum alloy. The aluminum alloy may be a 6xxx series aluminum alloy.

A portion of the roof panel 26 may be connected to a portion of the side body structure 16 via hemming, adhesive, welding, self-piercing rivets (not shown), or any combination of the above. The portions of the roof panel 26 and side body structure 16 connected to each other via hemming, adhesive, welding or self-piercing rivets may be aluminum alloy, and specifically may be a 6xxx series aluminum alloy.

Figure 2:
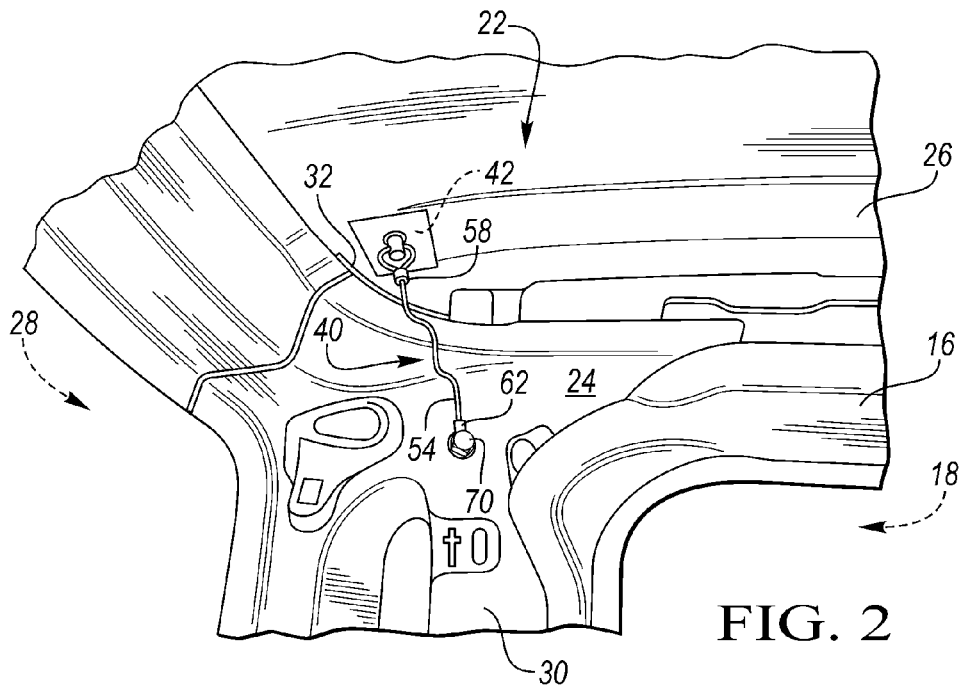
FIG. 2 is a partial perspective view of a vehicle roof panel connected to and extending away from a side body structure showcasing a tether assembly disposed between the two.

FIG. 2 shows a partial perspective view of the vehicle roof panel 26 connected to and extending away from the side body structure 16. From this view, a door opening 18 is seen on the right along with a rear window opening 28 on the left. The view is from the passenger compartment 22 looking outwardly from the vehicle 10 towards a C-pillar 30. C-pillar 30 may be part of the side body structure 16. In this view, a tether assembly 40 is shown connectedly disposed between the roof panel 26 and side body structure 16. A joint line 32 may be seen between the roof panel 26 and the body side structure 16. The tether assembly 40 bridges the joint line 32 connecting the two panels and holding them within a relative distance of each other if the joint line 32 was to open.

The tether assembly 40 is shown connected to both the roof panel 26 and side body structure 16 within the passenger compartment 22. Interior trim pieces have been removed from this view to allow the joint line 32 between the panels 16, 26 and the tether assembly 40 to be seen, however in a final assembly state of the vehicle 10 it is preferred that trim pieces would cover the tether assembly 40 from view.

Figure 3:
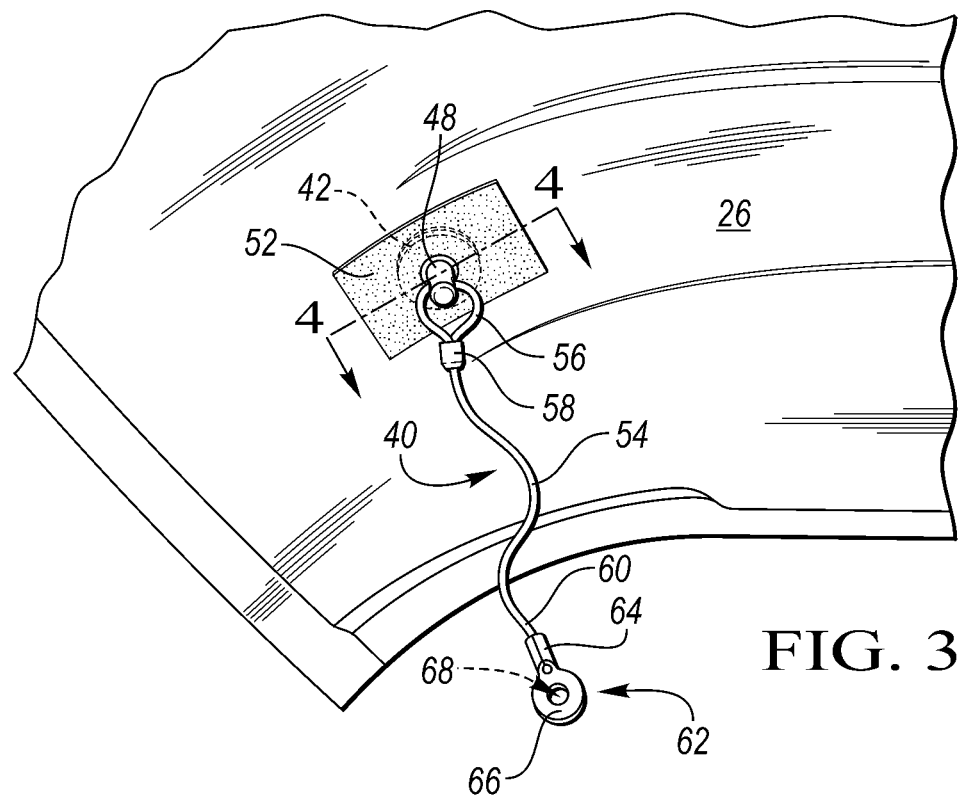
FIG. 3 is a partial bottom view of a roof panel showcasing a roof panel mounting component.
Figure 4:
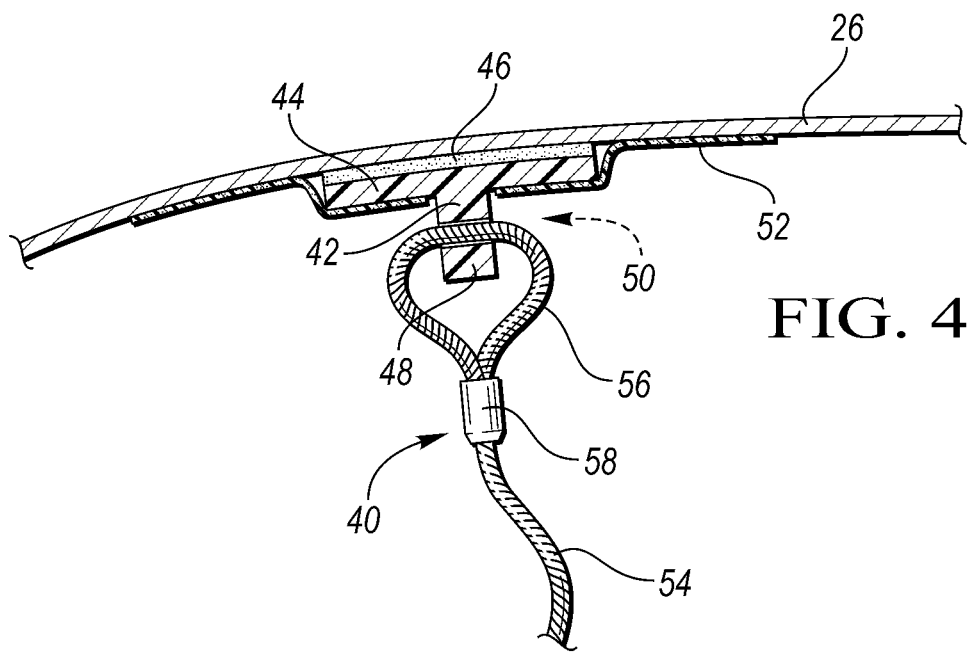
FIG. 4 is a cross-sectional view taken along line 4-4 in FIG. 3.

FIGS. 2, 3 and 4 showcase a tether assembly 40 in differing views. The tether assembly 40 has a roof panel mounting component 42 connected to the roof panel 26. The mounting component 42 has a substrate portion 44 that is adhesively connected to the roof panel 26 by an adhesive 46. Fastening methods other than that of an adhesive 46 may be used, however in places on the roof panel 26 where a fastener may not be able to pass through the roof panel 26, adhesive provides an effective attachment method. In addition, use of a fastener may require putting a hole in the roof panel 26 which may in turn require additional sealing means and additional exterior trim to hide the exterior side of the fastener used.

The mounting component 42 may also have a raised portion 48 extending from the substrate portion 44, as shown here. The raised portion 48 of the mounting component 42 may be used to define a tether hole 50. Alternatively, the substrate 44 of the mounting component 42 may be used to define a tether hole 50 (not shown) without need for a raised portion 48.

A piece of tape 52 may be adhesively connected to the roof panel 26 and disposed over a portion of the mounting component 42. The tape 52 may substantially cover the substrate 44 of the mounting component 42. In a final production assembly of the vehicle 10, however, the tape 52 may be removed. The tape 52 may be used during the adhesion process of the tether assembly 40 to the roof panel 26 (described in more detail below), and as such may not be needed to remain in position when the vehicle 10 is in a final assembly. However, much of the roof panel 26, side body structure 16, and tether assembly 40 may be covered by interior trim pieces when the vehicle 10 is in final assembly, and thus the tape 52 may remain.

The tether assembly 40 has a rope section 54. The rope section 54 may be a metal cable. The rope section has a first end 56 connected to the mounting component 42. The first end 56 of the rope section 54 may be routed through the tether hole 50 of the mounting component 42 and form a loop back onto itself. The first end 56 of the rope section 54 may form a loop and be secured to itself with a securing crimp piece 58. Said another way, the tether hole 50 may receive the loop of the first end 56 of the rope section 54, and in combination with the mounting component 42, connect the tether assembly 40 to the roof panel 26.

The rope section 54 may extend from the first end 56 to a second end 60. A crimped washer connector 62 having a securing portion 64 may be crimped around a portion of the second end 60 rope section 54. The connector 62 may also have a flat washer portion 66 extending from the securing portion 64 and defining a connector hole 68. The connector 62 may be connected to the internal panel 24 of the side body structure 16 by a fastener 70. Said another way, the fastener 70 may be disposed within the hole 68 of the crimped washer connector 62 to connect the tether assembly 40 to the side body structure 16.

Although the tether assembly 40 is shown attached to the roof panel 26 using a mounting component 42 and adhesive 46 while at the same time attached to the side body structure 16 using a connector 62 and a fastener 70, either end may be swapped out with the other such that a mounting component 42 and adhesive 46 may be used to secure the tether assembly 40 to the side body structure, and a connector 62 and fastener 70 may be used to secure the tether assembly 40 to the roof panel 26, or any combination. Although, as mentioned above, placing a fastener through a roof panel 26 may cause additional complication.

The above Figures support a method of tethering a roof panel 26 to a side body structure 16. In this example, a portion of the roof panel 26 is connected to a portion of the side body structure 16 using self-piercing rivets (not shown) or welding. The method includes taping a mounting component 42 of a first end of a tether assembly 40 to a roof panel 26. The mounting component 42 having a heat curing adhesive 46. The method includes fastening a connector 62 of a second end of a tether assembly 40 to a side body structure 16. The connector 62 may be fastened to the side body structure using a threaded fastener 70. The method includes activating the heat curing adhesive 46. Activation of the heat curing adhesive 46 may be done with an oven (not shown) to secure the mounting component to the roof panel 26. The oven used to activate the heat curing adhesive 46 may be from a paint oven process.

The method may also include Looping a first portion 56 of a rope section 54 of the tether assembly 40 through a hole 50 in a mounting component 42 and securing the rope section to itself. The method may also include crimping a connector 62 on a second portion 60 of a rope section 54 of the tether assembly 40. These two steps may be performed in any order and may even be performed after the mounting component 42 has been taped to the roof panel 26 or secured to the roof panel after an oven process. It is forseen that these two steps may also be performed well ahead of all of the other steps to provide a simple tether assembly 40 that is installed on the vehicle 10 at a body manufacturing location.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle comprising:
    a side body structure;
    a roof panel connectedly extending inwardly from the body structure;
    a mounting component having a substrate portion adhesively connected to the roof panel and defining a tether hole; and
    a tether connectedly extending between the tether hole of the mounting component and body structure.

2. The vehicle of claim 1 wherein the tether has a rope section having a first end and a second end, the first end of the rope section forms a loop and is secured to itself with a securing crimp piece, and the second end of the rope section is connected to a crimped washer connector.

3. The vehicle of claim 2 wherein the crimped washer connector has a securing portion crimped around the rope section and a flat washer portion extending from the securing portion defining a hole, and wherein a fastener is disposed within the hole and connects the tether to the side body structure.

4. The vehicle of claim 2 wherein the tether hole receives the loop of the first end of the rope section to connect the tether to the roof panel.

5. The vehicle of claim 2 wherein the rope section is a metal cable.

6. The vehicle of claim 1 wherein the roof panel is an aluminum alloy roof panel.

7. The vehicle of claim 1 wherein the side body structure is an aluminum alloy side body structure.

8. The vehicle of claim 1 wherein a portion of the roof panel is connected to a portion of the body structure with self-piercing rivets.

9. The vehicle of claim 1 wherein the roof panel and side body structure partially define a passenger compartment and the tether is connected to the roof panel and side body structure within the passenger compartment.

10. A pickup truck cab comprising:
    a side body assembly having an aluminum alloy internal panel;
    an aluminum alloy roof panel connected to and extending from the side body assembly;
    a mounting component adhesively connected to the roof panel; and
    a tether rope connected to the mounting component and to the internal panel.

11. The cab of claim 10 wherein the mounting component defines a tether hole and the tether rope has a first end routed through the tether hole forming a loop such that the tether rope is attached to itself.

12. The cab of claim 10 wherein the tether rope has a second end connected to a connector defining a connector hole, the connector being fastened to the internal panel with a fastener secured through the connector hole.

13. The cab of claim 10 wherein the tether rope has a metal cable.

14. The cab of claim 10 further comprising a piece of tape adhesively connected to the roof panel and covering a portion of the mounting component.

15. A method of tethering a roof panel to a side body structure comprising:
    taping a mounting component of a first end of a tether assembly to a roof panel, the mounting component having a heat curing adhesive;
    fastening a connector of a second end of a tether assembly to a side body structure using a threaded fastener; and
    activating the heat curing adhesive with an oven to secure the mounting component to the roof panel.

16. The method of claim 15 further comprising:
    looping a first portion of a rope section of the tether assembly through a hole in the mounting component and securing the rope section to itself.

17. The method of claim 15 further comprising:
    crimping the connector on a second portion of a rope section of the tether assembly.

18. The method of claim 15 further comprising:
    assembling a portion of the roof panel to a portion of the side body structure using self-piercing rivets.

19. The method of claim 15 further comprising:
    welding a portion of the roof panel to a portion of the side body structure.

20. The method of claim 15 wherein the oven used to activate the heat curing adhesive is from a paint oven process.

* * * * *